United States Patent [19]

Shinmitsu et al.

[11] Patent Number: 4,936,916

[45] Date of Patent: Jun. 26, 1990

[54] INK COMPOISITION CONTAINING MICROCAPSULES

[75] Inventors: Kazuyuki Shinmitsu, Nara; Shunsuke Shioi, Ikoma; Makoto Miyake, Ashiya, all of Japan

[73] Assignee: Kanszaki Paper Manufacturing Co. Ltd., Tokyo, Japan

[21] Appl. No.: 184,398

[22] Filed: Apr. 21, 1988

[30] Foreign Application Priority Data

Apr. 25, 1987 [JP] Japan .................. 62-102870

[51] Int. Cl.$^5$ .............. B01J 13/02; C09D 11/00; C09D 11/02
[52] U.S. Cl. ...................... 106/21; 264/4.7; 424/408; 428/402.21; 503/215; 512/4
[58] Field of Search ............ 264/4.7; 428/402.21; 106/21

[56] References Cited

U.S. PATENT DOCUMENTS

| | | | |
|---|---|---|---|
| 4,201,404 | 5/1980 | Charbonneau et al. | 106/21 X |
| 4,328,119 | 5/1982 | Iwasaki et al. | 264/4.7 |
| 4,396,670 | 8/1983 | Sinclair | 264/4.7 X |
| 4,525,520 | 6/1985 | Shioi et al. | 428/402.21 X |
| 4,574,110 | 3/1986 | Asano et al. | 428/402.21 |
| 4,601,863 | 7/1986 | Shioi et al. | 264/4.7 X |

FOREIGN PATENT DOCUMENTS 57-144788 9/1982 Japan .

*Primary Examiner*—Richard D. Lovering
*Attorney, Agent, or Firm*—Armstrong, Nikaido, Marmelstein, Kubovcik & Murray

[57] ABSTRACT

A non-aqueous printing ink composition containing a microcapsule and a microencapsulated ink composition characterized in that the microcapsule has a capsule wall comprising melamine-formaldehyde resin and has an average particle size of 1.8 to 3.5μ.

4 Claims, No Drawings

INK COMPOSITION CONTAINING MICROCAPSULES

The present invention relates to a printing ink composition containing microcapsules.

Microcapsules usually have a particle size of several microns to several tens of microns, and contain, therein drugs, agricultural chemicals, perfumes, dyes, liquid crystals, thermochromic materials, adhesives or the like, which are enclosed in a natural or synthetic polymer film. Microcapsules are useful because the contained material can be protected chemically, and/or physically and thus, liquid material can be treated as a solid material and thereby used in a wide field such as pressure sensitive recording paper and the like.

Known processes for preparing microcapsules include coacervation processes (disclosed, for example, in U.S. Pat. Nos. 2,800,457 and 2,800,458), interfacial polymerization processes (disclosed, for example, in Japanese Examined Patent Applications Nos. 19574/1963, 446/1967 and 771/1967 and U.S. Pat. No. 3,796,669), in-situ polymerization processes (disclosed, for example, in Japanese Examined Patent Application No. 9168/1961 and U.S. Pat. Nos. 4,001,140 and 4,100,103), etc. Thus, a wide variety of techniques have been developed.

Microcapsules thus obtained are coated on a substrate such as a paper and film or used in the form of a powder. Microcapsules containing a perfume, liquid crystals, thermochromic materials, electron donating chromogenic materials, ligand compounds or the like are usually prepared in an aqueous medium and made into a coating composition with or without addition of an auxiliary agent. The coating composition is applied to a substrate for example by air knife coating, roll coating, blade coating or the like, or printed on a substrate for example by silk screen printing, flexographic printing, gravure printing or the like.

Among them, coating by a printer is more preferable than coating by a coater in view of savings in material because a partial coating is possible in the former but impossible in the latter. However, in the case of an aqueous dispersion of microcapsules being used as a printing ink, a lot of energy is required for drying which results in a low printing speed. In order to obtain a high printing speed, a large drying apparatus is required. Further, a paper substrate coated with the above aqueous dispersion shrinks and particularly, when subjected to a partial printing, is apt to cockle more easily, thus being made difficult to use.

The use of a non-aqueous microcapsule composition employing an organic medium in stead of water is one of methods which solves the above problems. For example, non-aqueous microcapsule ink compositions are disclosed in Japanese Unexamined Patent Application Nos. 86612/1973, 32717/1974, 144788/1982, 101080/1985 and the like.

However, non-aqueous microcapsule ink compositions conventionally developed have at least one defect which described below and needs to be improved.

① It has been found that the greater the amount of microcapsules to be coated on the substrate, the higher is the quality in product (e.g., excellent color forming ability in case of pressure sensitive recording paper). However, since the capsule does not transfer from the printing plate to the substrate as well as its carrier vehicle it is often observed that the number of capsules actually transferred is small since the vehicle in the composition selectively transfers to the substrate, even if the ink composition is applied in a sufficient amount.

② It is considered the higher the amount of the ingredients enclosed in the microcapsule to be released, the higher is the quality in product (e.g., excellent color forming ability in case of pressure sensitive recording paper). However, amount of enclosed material actually released from the capsule is small even if an ink composition is applied in a sufficient amount.

③ Due to insufficient transferability of the microcapsule, capsule ingredients that are apt to remain on the printing plate when printing, or to accumulate at the printing plate edge when partially printing, an even printed surface is not obtained.

For example, Japanese Unexamined Patent Application No. 144788/1982 discloses a printing ink composition containing capsules having a wall material of urea-formaldehyde resin. The capsule is however, slightly inferior in core material retainability and the wall has to be made thick when it is used to carry an ink using an organic solvent vehicle. Accordingly, the smaller the capsule is in the particle size, the poorer is the release of the enclosed ingredients when pressure is applied. Therefore, a pressure sensitive recording paper prepared by using such a capsule is extremely low in color forming ability. In contrast, with increase of the particle size, the capsule is apt to become markedly inferior in transferability, and particularly in a partial printing of flexographic ink, this tendency is remarkable.

Thus, a capsule ink is not obtained conventionally which is well-balanced as to both transferability and release of the capsule ingredients, even though a capsule having any particle size is used.

An object of the invention is to provide a non-aqueous microcapsulated ink composition which is excellent both in transferability of the capsule from printing plate to a substrate, and in release of the ingredients contained in the capsule coated on a substrates when pressed.

The above and other objects of the invention will become apparent from the following description.

In a non-aqueous printing ink composition containing a microcapsule, the present invention provides a microcapsule ink composition characterized in that the microcapsule has a capsule wall of melamine-formaldehyde resin and has an average particle size of 1 to 4 $\mu$.

The inventors of the present application have investigated particle size of the capsule and the capsule wall material in a non-aqueous microcapsule ink composition and have achieved the present invention.

The reason why the above excellent effects are achieved is thought to be that melamine-formaldehyde resin film is extremely thin or fine compared with other wall forming material, excellent in resistance to solvent and further relatively fragile, thus the present microcapsule is readily ruptured when pressed even if the capsule has a very small particle size. The present composition is, therefore, well-balanced in both of transferability and release of the capsule ingredients by using microcapsules of the above capsule wall material and having a particle size of 1 to 4 $\mu$ preferably 1.8 to 3.5 $\mu$.

The microcapsule used in the present invention which has capsule wall of melamine-formaldehyde resin is prepared by the methods disclosed, for example, in Japanese Unexamined Patent Application Nos. 84881/1978, 49984/1979, 15660/1980, 51431/1980, 102934/1981, 58536/1981, 51238/1981, 105236/1982, 14942/1983, 162943/1984, 177129/1984, 196731/1984, 230634/1984 and 28819/1985. In these methods, the microcapsule is prepared by emulsifying a hydrophobic liquid in the form of fine droplets in an aqueous medium having an emulsifier incorporated therein, condensing melamine-formaldehyde resin precondensate contained in the aqueous medium, or in the hydrophobic liquid, under acidic condition with heating, and accumulating the resin film around fine droplets of the hydrophobic liquid.

Microcapsules used in the present invention include those obtained from melamine-formaldehyde resin precondensate singly or incombination with other wall forming material, provided that the wall properties do not change greatly. For example, it is possible to use mixtures of melamine-formaldehyde resin precondensate and other aldehyde resin forming materials.

The melamine-formaldehyde resin precondensate includes those obtained by a polycondensation of melamine and formaldehyde, alkylates or partial alkylates prepared by the reaction with an alcohol having 1 to 8 carbon atoms, their anion, cation or nonion modified precondensates.

Examples of the anionic modifiers are sulfamic acid, sulfanilic acid, glycollic acid, glycine, acid sulfities, phenol sulfonate and taurine. Examples of the cationic modifiers are diethylenetriamine, triethylene-tetramine, tetraethylenepentamine and dimethylaminoethanol. Examples of the nonionic modifiers are ethylene glycol and diethylene glycol.

Examples of other aldehyde resin forming materials conjointly used with the melamine-formaldehyde resin precondensate are phenol-formaldehyde resin precondensates and aminoaldehyde resin precondensates other than melamine-formaldehyde resin precondensate. The phenol-formaldehyde resin precondensate can be obtained by a condensation reaction of formaldehyde and at least one phenol selected among phenol, cresol, xylenol, resorcinol, hydroquinone, pyrocatechol and pyrogallol. The aminoaldehyde resin precondensate is prepared by a condensation reaction of at least one amine and at least one aldehyde. Useful amines include urea, thiourea, alkylurea, ethyleneurea, acetoguanamine, bezoguanamine, guanidine, dicyandiamide, biuret and cyanamide. Useful aldehydes include formaldehyde, acetaldehyde, paraformaldehyde, hexamethylenetetramine, glutaraldehyde, glyoxal and furfural. Furthermore, their alkylates or partial alkylates prepared by the reaction with an alcohol having 1 to 8 carbon atoms, their anion, cation or nonion modified precondensates are also used. The same anionic, cationic and nonionic modifier as above are usuable.

The amount of the melamine-formaldehyde resin precondensate to be added is preferably, in terms of melamine, 3 to 50 parts by weight, more preferably 5 to 30 parts by weight based on 100 parts by weight of the hydrophobic core material in view of the needed balance between capsule core material retainability and release of capsule ingredients when pressed, though it cannot be determined specifically because it depends on the kind of hydrophobic core material, the kind and amount of other aldehyde resin forming material conjointly used, capsule particle size and use of the printed product, etc.

Other aldehyde resin forming materials used in combination with the melamine-formaldehyde resin precondensate should be used without reducing the desirable properties of the condensate and is used usually in a proportion of up to 80 parts by weight, preferably up to 20 parts by weight based on 100 parts by weight of the precondensate, though the amount cannot be determined specifically without specifying the kind of hydrophobic core material, use of the printed product, etc.

The microcapsules used in the present invention are characterized by a capsule wall of melamine-formaldehyde resin. Preferably, there are used microcapsules prepared by condensation of a melamine-formaldehyde resin precondensate in an aqueous medium. More preferably these are used microcapsules prepared by condensing methylated methylolmelamine precondensate in an aqueous medium, since a microcapsule ink composition is obtained which is excellent in its release of the core material.

The microcapsules used in the present invention include those having a two layers walls which may be prepared by condensing melamine-formaldehyde resin precondensate in an aqueous medium to accumulate the condensates around a hydrophobic core material surface and, at the same time, by reaction oil-soluble melamine-formaldehyde resin precondensate (Japanese unexamined patent publication No. 7935/1985), the above other oil-soluble aldehyde resin forming material, or a polyisocyanate compound (Japanese unexamined patent publication No. 115371/1981), which is contained in the core material. In case of using a polyisocyanate compound emulsifying, a hydrophobic liquid containing the polyisocyanate compound in the form of fine droplets in an aqueous medium containing an emulsifier, adding melamine-formaldehyde resin precondensate to the aqueous medium, condensing the precondensate at acid conditions with heating to accumulate melamine-formaldehyde resin on the fine droplet surface, thereafter rendering the system alkaline, and when required, adding a polyamine a polyol or the like to react with the polyisocyanate compound to form a polyurethane or a polyurea wall. Examples of useful polyisocyanate compounds are m-phenylene diisocyanate, p-phenylene diisocyanate, 2,6-tolylene diisocyanate, 2,4-tolylene diisocyanate, naphthalene-1,4-diisocyanate, diphenylmethane-4,4-diisocyanate, xylylene-1,4-diisocyanate, xylylene-1,3-diisocyanate, trimethylene diisocyanate, hexamethylene diisocyanate, propylene-1,2-diisocyanate, butylene-1,2-diisocyanate, ethylidene diisocyanate, cyclohexylene-1,2-diisocyanate and cyclohexylene-1,4-diisocyanate. Also are included prepolymers such as an adduct of hexamethylene diisocyanate and/or an hexanetriol, and adduct of xylylene diisocyanate and trimethylolpropane. The polyisocyanate compound is usually used in an amount of up to 20 parts by weight per 100 parts by weight of the hydrophobic core material.

Examples of polyamines which react with the polyisocyanate compound to form wall films are ethylenediamine, hexamethylenediamine, octamethylenediamine, triethylenetetramine, p-phenylenediamine, piperazine, diethylenetriamine and an adduct of epoxy resin and amine. Polyols include catechol, resorcin, 3,4-dihydroxytoluene, 2,4-dihydroxyethylbenzene, 1,3-naphthalenediol, 1,5-naphthalenediol, 2,2'-dihydroxybiphenyl, 4,4'-dihydroxybiphenyl, bisphenol A, ethylene glycol, 1,3-propylene glycol, 1,4-butylene glycol, 1,5-pentanediol, 1,1,1-trimethylolpropane, hexanetriol, pentaerythritol, glycerin and sorbitol. The polyol is used usually in an amount of up to 50 parts by weight per 100 parts by weight of the polyisocyanate compound.

Examples of emulsifiers used in the preparation of microcapsules in the present invention are anionic, nonionic, cationic and ampholytic high molecular or low molecular compounds.

Examples of anionic high molecular compounds are natural polymers such as gum arabic, carrageenan, sodium alginate; semi-synthetic polymers such as carboxymethyl cellulose, sulfated cellulose, phosphated starch and lignin sulfonic acid; and synthetic polymers such as maleic anhydride copolymers (including hydrolyzates thereof), acrylic acid, methacrylic acid or crotonic acid homopolymers and copolymers, vinylbenzenesulfonic acid or 2-acrylamido-2-methylpropanesulfonic acid homopolymers and copolymers, and partial amides or partial esters of such homopolymers and copolymers, carboxy modified polyvinyl alcohol, sulfonic acid-modified polyvinyl alcohol and phosphoric acid-modified polyvinyl alcohol.

Examples of the maleic anhydride copolymers (including hydrolyzates thereof) are ethylene/maleic anhydride copolymer, styrene/maleic anhydride copolymer, etc.

Useful examples of acrylic acid, methacrylic acid and crotonic acid copolymers are methyl acrylate/acrylic acid copolymer (hereinafter the term "copolymer" is abbreviated), ethyl acrylate/acrylic acid, methyl acrylate/methacrylic acid, methyl methacrylate/acrylic acid, vinyl acetate/crotonic acid, etc.

Useful examples of vinylbenzene sulfonic acid or 2-acrylamido-2-methyl-propanesulfonic acid copolymers are methyl acrylate/vinylbenzene sulfonic acid copolymer (or salt thereof), vinylpyrrolidone/2-acrylamide-2-methyl-propanesulfonic acid copolymer, etc.

Examples of nonionic high molecular compounds are semi-synthetic polymers such as hydroxyethyl cellulose and methyl cellulose and synthetic polymers such as polyvinyl alcohol.

An example of a cationic high molecular compounds is cation-modified polyvinyl alcohol, and an example of a ampholytic high molecular compound is gelatine.

The low molecular emulsifiers include sodium vinylsulfonate, sodium benzenesulfonate, sodium p-vinylbenzenesulfonate, sodium naphthalene-α-sulfonate, sodium diphenylphosphate, sodium phenylphosphonate and sodium di-n-butylphosphate.

The emulsifiers are preferably contained in an aqueous medium in an amount of 0.5 wt % or more, preferably 1 wt % or more from the points of view of preparation and stability of the emulsion. The upper limit of the usage, which dependant on the viscosity of the system, the capsule preparing apparatus, etc., is generally 20 wt %.

In the preparation of microcapsules according to the invention, to keep the reaction system acidic there, is used an acid catalyst such as formic acid, acetic acid, citric acid, oxalic acid, p-toluenesulfonic acid, hydrochloric acid, and sulfuric acid which are generally known be used in the amino-aldehyde resin manufacture.

The reaction condition for preparing microcapsules in the present invention cannot be determined definitely but vary with the kind of the melamine-formaldehyde resin precondensate, whether and which other aldehyde resin forming material polyisocyanate compound is used in combination, or and the use of the printed product. The reaction is conducted preferably at a pH of up to 5.0 and at least 50° C., more preferably at a pH of up to 4.5 and at least 70° C. and most preferably at a pH of up to 3.8 and at least 75° C. The reaction is carried out at the above condition for preferably at least one hour and more preferably at least 3 hours.

As a core material for microcapsules used in the present invention, hydrophobic materials known in the field are used, such as perfumes, insecticides and like chemicals, liquid crystals, thermochromic materials, coloring dyes, electron donating organic chromogenic materials, electron accepting reactant materials, ligand compounds and organic metal salts. These core materials can be used they are, or as dissolved or dispersed in a hydrophobic medium.

In the invention, the aqueous microcapsule dispersion obtained as set forth above is made into the desired microcapsule composition by dispersing it as formed aqueous dispersion in an organic solvent, with or without filtration or concentration at a reduced pressure of the aqueous dispersion. Alternately, the aqueous dispersion is made into the desired microcapsule composition by drying the aqueous dispersion to powdery microcapsules by air drying, surface drying, flow drying, airstream drying, spray drying, vacuum drying, freeze drying, infrared drying, high-frequency drying, ultrasonic drying, pulverization drying or like method and then dispersing the powder in an organic solvent. Further, the desired microcapsule composition can be obtained by mixing the aqueous microcapsule dispersion and an organic solvent and removing the aqueous medium at a reduced pressure or by filtering the aqueous microcapsule dispersion, washing the filtrates with water-miscible solvent and again dispersing them in an organic solvent.

Particularly perferable microcapsule dispersion is that disclosed in Japanese unexamined patent publication No. 238141/1985 which is obtained by treating a microcapsule dispersion with aldehyde resin forming material, since it is easily dehydrated and provides an ink which is excellent in dispersibility.

The present non-aqueous microcapsule ink composition basically comprises the above specific microcapsules and vehicles such as organic solvent, oil and resin. The amount of the microcapsule is not critical depending on the kind of capsule wall, particle size of the capsule and the like, but is usually 5 to 100 parts by weight per 100 parts by weight of the vehicles.

The composition may contain, as required, various auxiliary agents such as pigments, capsule-protecting agents, surfactants, ultraviolet ray absorbing agents, antioxidants, fluorescent dyes, photopolymerization initiators, waxes, driers, viscosity-increasing agent, gelation agents, plasticizers, desensitizers, electron donating organic chromogenic materials, electron accepting reactant materials, ligand compounds and organic metal salts.

The organic solvents include benzene, toluene, xylene, cyclohexane, hexane, ligroin, methyl isobutyl ketone, methyl acetate, ethyl acetate, butyl acetate, methyl CELLOSOLVE, ethyl CELLOSOLVE, butyl CELLOSOLVE, diethylene glycol monobutyl ether, diethylene glycol monobutyl ether acetate, methanol, ethanol, n-propyl alcohol, isopropyl alcohol, n-butanol, n-hexanol, cyclohexanol and 2-ethylhexyl alcohol.

Example of useful oils are vegetable oils such as linseed oil, safflower oil and like drying oil, soybean oil and like semi-drying oil and castor oil and like non-drying oil; process oils such as dehydrated castor oil, polymerized oil, maleinized oil, vinylation oil and urethanated oil; mineral oils such as machine oil and spindle oil.

Examples of useful resins are natural resins such as rosin (gum rosin, wood rosin, tall oil rosin), shellac, copal, dammar, gilsonite and zein; semi-synthetic resins such as hardened rosin, ester gum and other rosin esters, maleic acid resin, fumaric acid resin, dimer rosin, polymer rosin, rosin-modified phenol resin, methyl cellulose, ethyl cellulose, hydroxyethyl cellulose, hydroxypropyl cellulose, ethyl hydroxyethyl cellulose, carboxymethyl cellulose, cellulose acetate propionate, cellulose acetate butyrate and nitrocellulose; synthetic resins such as phenolic resin, xylenic resin, urea resin, melamine resin, ketone resin, coumarone-indene resin, petroleum resin, terpene resin, cyclized rubber, rubber chloride, alkyd resin, polyamide resin, acrylic resin, polyvinyl chloride, vinyl chloride-vinyl acetate copolymer, polyvinyl acetate, ethylene-maleic anhydride copolymer, styrene-maleic anhydride copolymer, methyl vinyl ether-maleic anhydride copolymer, isobutylene-maleic anhydride copolymer, polyvinyl alcohol, modified polyvinyl alcohol, polyvinyl butyral (butyral resin), polyvinyl pyrrolidone, chlorinated polypropylene, styrene resin, epoxy resin and polyurethane. Further, the resin includes an oligomer or prepolymer having an ethylenically unsaturated bond such as polyethylene glycol diacrylate, propylene glycol dimethacrylate, pentaerythritol triacrylate, trimethylolpropane diacrylate, trimethylolpropane triacrylate, pentaerythritol tetraacrylate, hexanediol diacrylate, 1,2-butanediol diacrylate, adduct of epoxy resin and acrylic acid, reaction product of acrylic acid, methacrylic acid and pentaerythritol, condensed product of maleic acid, diethylene glycol and acrylic acid, methyl methacrylate, butyl methacrylate and styrene.

Example of pigments are inorganic pigments such as oxide, hydroxide, carbonate, sulfate or halide of aluminum, zinc, magnesium, calcium, titanium; acidic clay, activated clay, attapulgite, zeolite, bentonite, kaolin and calcined kaolin and like clay minerals; organic pigments such as melamine resin and urea resin.

Example of capsule-protecting agents are cellulose powder, starch particles, microsphere, glass beads and synthetic resin powder.

In the present invention, the above vehicles and auxiliary agents can be suitably selected and used depending on the respective printing processes according to conventional techniques. For example, they can be employed according to the method described in "Printing and Ink Technology" published by CMC Inc, 1982, Japan.

In flexographic printing and gravure printing compositions the organic solvent preferably used is a solvent mixture of at least one alcohol having 1 to 3 carbon atoms and at least one alcohol having 4 to 8 carbon atoms, or a mixture having added water, the above acetate or CELLOSOLVE thereto. Further, as a resin is preferably used polyvinyl acetate, vinyl chloride-vinyl acetate copolymer, ethylene-maleic anhydride copolymer, styrene-maleic anhydride copolymer, methyl vinyl ether-maleic anhydride copolymer, isobutylene-maleic anhydride copolymer, modified polyvinyl pyrrolidone, ethyl cellulose, nitrocellulose, hydroxypropyl cellulose, cellulose acetate propionate and cellulose acetate butyrate. As the pigment which is added as required there, is preferably used one having an average particle size of up to 3 $\mu$. The amounts of these components to be used are not particularly limited but usually 10 to 100 parts by weight of the microcapsule, 1 to 100 parts by weight of the resin and 0.1 to 50 parts by weight of the pigment are used per 100 parts by weight of the organic solvent.

In an ink composition curable by electron beams or ultraviolet rays, as a resin is used an oligomer or prepolymer having an ethylenically unsaturated bond. To the ink composition curable by ultraviolet rays, there is usually added a photopolymerization initiator.

Oils are usable as a vehicle for compositions curable by oxidative polymerization (typography ink composition). Further, a solvent, wax, drier, viscosity-increasing agent, gelation agents and agents for providing thixotropy can be added as required. The solvents used in the above are preferably diethylene glycol monobutyl ether and diethylene glycol monobutyl ether acetate.

The present microcapsule ink composition obtained as above is applied to a substrate by methods known in the printing field. The particularly excellent effect of the present invention is achieved in a partial printing (spot printing) by a flexographic or gravure printing process which uses a capsule ink composition containing a vehicle mainly composed of alcohols. As the substrate, there is usually used paper, synthetic paper, plastic film or the like.

The printed product prepared by employing the present microcapsule composition can be used in known fields including pressure sensitive recording paper as described above. Particularly, in case of using a capsule ink containing an electron donating organic chromogenic material as encapsulated core material in combination with a polyvalent metal salt of an aromatic carboxylic acid as an electron accepting reactant material, a pressure sensitive recording paper having highly excellent properties is obtained.

The invention will be described with reference to the following Examples applied to the field of various capsule ink compositions to be used for a pressure sensitive recording paper. It should be understood, however, that this will not limit the scope of the present invention.

EXAMPLE 1

Preparation of a non-aqueous ink composition contained in microcapsules having a wall film of melamine-formaldehyde resin for a pressure sensitive recording sheet In 100 parts of alkyldiphenylethane (Hisol SA S-296, Nippon Petrochemicals Co., Ltd.) was dissolved with heating 8 parts of crystal violet lactone to obtain an encapsulated oil. To 200 parts of 3.0% aqueous solution of ethylene-maleic anhydride copolymer (EMA-31, Monsanto Co., Ltd.) was added 20% aqueous solution of sodium hydroxide to adjust the pH to 6.0. The above oil for encapsulation was emulsified in the solution and the emulsion was heated to 55° C.

Separately, to 45 parts of 37% aqueous solution of formaldehyde was added 15 parts of melamine and the mixture was reacted at 60° C. for 15 minutes to prepare a prepolymer solution.

The prepolymer solution was added dropwise to the above emulsion and 0.1N HCl was added dropwise thereto with stirring to adjust the pH to 5.3, and the mixture was heated to 80° C., and maintained at that temperature for one hour. Thereto was added 0.2N HCl to adjust the pH to 3.5, and the mixture was maintained at 80° C. for 3 hours, then allowed to cool to obtain a capsule dispersion containing particles 2.3 $\mu$ in average size.

The dispersion was filtered and washed with ethanol. The resulting capsules (140 parts as solids) were dispersed in a solvent mixture of 330 parts of ethanol and 165 parts of n-hexanol. Thereto were added 25 parts of precipitated calcium carbonate (1 $\mu$ in average particle size) and 30 parts of ethyl cellulose No. 14 (Hercules Inc.) to prepare a flexographic capsule ink composition.

PREPARATION OF AN UNDER SHEET

A 65-parts quantity of precipitated calcium carbonate, 20 parts of zinc oxide, 15 parts of molten mixture(80/20) of zinc 3,5-di($\alpha$-methylbenzyl)salicylate and $\alpha$-methylstyrene/styrene copolymer, 5 parts (as solids) of aqueous solution of polyvinyl alcohol and 300 parts of water were pulverized by a ball mill for 24 hours to obtain a dispersion. To the dispersion was added 20 parts (as solids) of carboxy-modified styrene/butadiene copolymer latex to prepare a color acceptor coating composition. The coating composition was applied by an air-knife coater to a paper substrate weighing 40 g/m$^2$ in an amount of 5 g/m$^2$ by dry weight to obtain an under sheet.

PREPARATION OF A MIDDLE SHEET

The above under sheet was printed on its rear surface in a 10 cm×10 cm spot with the above capsule ink composition at a printing speed of 80 m/min. in amount of 2.5 g/m$^2$ by a dry weight by Business-form printer to obtain a middle sheet.

EXAMPLE 2

A flexographic capsule ink composition was prepared in the same manner as in Example 1 with the exception of using a capsule dispersion containing particles 2.9 $\mu$ in average size. A middle sheet was obtained in the same manner as in Example 1 by spot printing with the use of the capsule ink composition.

EXAMPLE 3

A flexographic capsule ink composition was prepared in the same manner as in Example 1 with the exception of using a capsule dispersion containing particles 3.9 $\mu$ in average size. A middle sheet was obtained in the same manner as in Example 1 by spot printing with the use of the capsule ink composition.

EXAMPLE 4

A flexographic capsule ink composition was prepared in the same manner as in Example 1 with the exception of using a capsule dispersion containing particles 1.4 $\mu$ in average size. A middle sheet was obtained in the same manner as in Example 1 by spot printing with the use of the capsule ink composition.

EXAMPLE 5

A flexographic capsule ink composition was prepared in the same manner as in Example 1 with the exception of using a capsule dispersion containing particles 1.8 $\mu$ in average size. A middle sheet was obtained in the same manner as in Example 1 by spot printing with the use of the capsule ink composition.

EXAMPLE 6

A flexographic capsule ink composition was prepared in the same manner as in Example 1 with the exception of using a capsule dispersion containing particles 3.5 $\mu$ in average size. A middle sheet was obtained in the same manner as in Example 1 by spot printing with the use of the capsule ink composition.

EXAMPLE 7

In 100 parts of alkyldiphenylethane (Hisol SA S-296, Nippon Petrochemicals Co., Ltd.) was dissolved with heating 8 parts of crystal violet lactone to obtain an encapsulated oil. To 200 parts of 3.0% aqueous solution of ethylene-maleic anhydride copolymer (EMA-31, Monsanto Co., Ltd.) was added 20% aqueous solution of sodium hydroxide to adjust the pH to 4.8. The above oil for encapsulation was emulsified in the solution and the emulsion was heated to 75° C.

To the above emulsion was added at 75° C. 40 parts (as solids) of methylated methylolmelamine resin precondensate (Cymel 350, Mitsui Toatsu Chemicals Inc.). Thereto 0.1N H$_2$SO$_4$ was added dropwise with stirring to adjust the pH to 3.5, and the mixture was heated to 95° C., and maintained at that temperature for 5 hours to obtain a capsule dispersion containing particles 2.6 $\mu$ in average size.

To the dispersion was added 100 parts of 10% aqueous solution of Cymel 350 and the mixture was maintained at 95° C. for one hour, and then filtered by suction and washed with ethanol. The resulting capsules (140 parts as solids) were dispersed in a solvent mixture of 330 parts of ethanol and 165 parts of n-hexanol. Thereto were added 25 parts of precipitated calcium carbonate (1 $\mu$ in average particle size) and 30 parts of ethyl cellulose No. 14 (Hercules Inc.) to prepare a flexographic capsule ink composition.

A middle sheet was obtained in the same manner as in Example 1 by spot printing with the use of the capsule ink composition.

EXAMPLE 8

A flexographic capsule ink composition was prepared in the same manner as in Example 7 with the exception of using a capsule dispersion containing particles 1.9 $\mu$ in average size. A middle sheet was obtained in the same manner as in Example 7 by spot printing with the use of the capsule ink composition.

EXAMPLE 9

An under sheet obtained in the same manner as in Example 1 was printed on its rear surface in a 10 cm×10 cm spot by a capsule ink composition prepared in the same manner as in Example 2 at a printing speed of 60 m/min. in amount of 2.5 g/m$^2$ by dry weight by a gravure printer to obtain a middle sheet.

COMPARISON EXAMPLE 1

A flexographic capsule ink composition was prepared in the same manner as in Example 1 with the exception of using a capsule dispersion containing particles 4.2 $\mu$ in average size. A middle sheet was obtained in the same manner as in Example 1 by spot printing with the use of the capsule ink composition.

COMPARISON EXAMPLE 2

A flexographic capsule ink composition was prepared in the same manner as in Example 1 with the exception of using a capsule dispersion containing particles 0.9 $\mu$ in average size. A middle sheet was obtained in the same manner as in Example 1 by spot printing with the use of the capsule ink composition.

COMPARISON EXAMPLE 3

Preparation of a non-aqueous ink composition containing microcapsule having a wall film of urea-formaldehyde resin for a pressure sensitive recording sheet To 100 parts of a 5.0% aqueous solution of styrene-maleic anhydride copolymer (Scripset 520, Monsanto Co., Ltd.) was added 20% aqueous solution of sodium hydroxide to adjust the pH to 4.0. The encapsulated oil obtained in Example 1 was emulsified in the above solution. To the emulsion was added a solution of 20 parts of urea and 2 parts of resorcin in 100 cc of water. Thereto was further added 50 parts of a 37% aqueous solution of formaldehyde and the mixture was reacted at 60° C. for 5 hours to prepare a capsule dispersion containing particles 2.9 μ in average size.

The dispersion was filtered and washed with ethanol. The resulting capsules (140 parts as solids) were dispersed in a solvent mixture of 330 parts of ethanol and 165 parts of n-hexanol. Thereto were added 25 parts of precipitated calcium carbonate (1 μ in average particle size) and 30 parts of ethyl cellulose No. 14 to prepare a flexographic capsule ink composition. A middle sheet was obtained in the same manner as in Example 1 by spot printing with the use of the capsule ink composition.

COMPARISON EXAMPLE 4

A flexographic capsule ink composition was prepared in the same manner as in Comparison Example 3 with the exception of using a capsule dispersion containing particles 4.2 μ in average size. A middle sheet was obtained in the same manner as in Comparison Example 3 by spot printing with the use of the capsule ink composition.

COMPARISON EXAMPLE 5

Preparation of a non-aqueous ink composition containing microcapsule having a wall film of urethane-urea for a pressure sensitive recording sheet.

In the encapsulation oil obtained in Example 1 was dissolved 30 parts of aromatic polyisocyanate (Coronate L. Nihon Polyurethane Co., Ltd.). The solution was emulsified in 200 parts of 2% aqueous solution of polyvinyl alcohol and the reaction was conducted at 80° C. for 4 hours to prepare a capsule dispersion containing particles 2.9 μ in average size.

The dispersion was filtered and washed with ethanol. The resulting capsules (140 parts as solids) were dispersed in a solvent mixture of 330 parts of ethanol and 165 parts of n-hexanol. Thereto were added 25 parts of precipitated calcium carbonate (1 μ in average particle size) and 30 parts of ethyl cellulose No. 14 to prepare a flexographic capsule ink composition. A middle sheet was obtained in the same manner as in Example 1 by spot printing with the use of the capsule ink composition.

COMPARISON EXAMPLE 6

A flexographic capsule ink composition was prepared in the same manner as in Comparison Example 5 with the exception of using a capsule dispersion containing particles 4.2 μ in average size. A middle sheet was obtained in the same manner as in Comparison Example 5 by spot printing with the use of the capsule ink composition.

EVALUATION

The capsules of the above Examples and Comparison Examples were checked for resistance to solvent in the ink composition, transferability of capsule ingredients from the printing plate to the under sheet when the capsule ink composition is printed on the under sheet and copying amenability of the pressure sensitive copying paper obtained by printing. The results are shown in Table 1.

The microcapsule ink composition of the invention comprises microcapsules having a capsule wall formed from a specific material and having a specific particle size of 1 to 4 μ. Accordingly, compared with a capsule having another capsule wall or a capsule having a particle size out of the present range, the capsule of the invention is much better in resistance to solvent in the ink composition, transferability of capsule ingredients from the printing plate to the under sheet and copying amenability of the pressure sensitive copying paper obtained by printing the present capsule ink composition.

TABLE 1

|  | Resistance to solvent (*1) | Transferability (*2) | Copying (*3) amenability |
|---|---|---|---|
| Ex. 1 | ○ | ◎ | 0.40 |
| Ex. 2 | ○ | ◎ | 0.40 |
| Ex. 3 | ○ | ◎ | 0.38 |
| Ex. 4 | ○ | ◎ | 0.34 |
| Ex. 5 | ○ | ◎ | 0.38 |
| Ex. 6 | ○ | ◎ | 0.40 |
| Ex. 7 | ○ | ◎ | 0.43 |
| Ex. 8 | ○ | ◎ | 0.42 |
| Ex. 9 | ○ | ◎ | 0.35 |
| Com. Ex. 1 | ○ | X | 0.28 |
| Com. Ex. 2 | ○ | ◎ | 0.27 |
| Com. Ex. 3 | Δ | ◎ | 0.20 |
| Com. Ex. 4 | Δ | X | 0.27 |
| Com. Ex. 5 | X | ◎ | 0.19 |
| Com. Ex. 6 | X | X | 0.28 |

(*1) Resistance to solvent

In a capsule ink composition, capsule core material is extracted by solvents and consequently the core material penetrates through the paper upon printing, and reacts with a color acceptor to form a color. This color smudge is shown by the following criteria.

○ . . . no smude
Δ . . . a little smudge but practically a problem
X . . . heavy smudge and practically unusable (*2) Transferability When printing, capsule ingredients transfer from printing plate to the under sheet. Thus, accumulation of ink at the printing plate edge and amount of capsule ingredients remaining on the printer were observed.

◎ . . . capsule ingredients transfer thoroughly
○ . . . a little capsule ingredients remain but practically no problem
X . . . a considerable amount of capsule ingredients remain and practically unusable due to unevennes of printed surface (*3) Copying amenability Two sheets of pressure sensitive recording papers (middle sheets) were superposed and copied images were formed by a typewriter (HERMES 700 EL). The image was checked for color density with use of Macbeth densitometer.

We claim:

1. In an organic solvent type printing ink composition comprising a vehicle and microcapsules having at least one hydrophobic material encapsulated in the core thereof; the improvement which comprises said microcapsules having a capsule wall comprising melamine-formaldehyde resin, and having a particle size of 1.8 to 3.5 microns.

2. A microcapsule ink composition as claimed in claim 1 wherein the melamine-formaldehyde resin is formed by condensation of a melamine-formaldehyde resin precondensate in an aqueous medium.

3. A microcapsule ink composition as claimed in claim 2 wherein the melamine-formaldehyde resin precondensate is used in an amount of 3 to 50 parts by weight in term of melamine based on 100 parts by weight of the hydrophobic material.

4. A microcapsule ink composition as defined in claim 3 wherein the melamine-formaldehyde resin precondensate is used in an amount of 5 to 30 parts by weight in term of melamine based on 100 parts by weight of the hydrophobic material.

* * * * *